United States Patent
Kierzkowski et al.

(10) Patent No.: US 9,868,319 B2
(45) Date of Patent: *Jan. 16, 2018

(54) IN TIRE SOUND ABSORBER

(71) Applicant: Zephyros, Inc., Romeo, MI (US)

(72) Inventors: Marek Henryk Kierzkowski, Ferntree Gully (AU); Philip John Gibbons, Hughesdale (AU); Bruce Reginald Gascoigne, Moorabbin (AU); Michael William Coates, Glen Iris (AU)

(73) Assignee: ZEPHYROS, INC., Romeo, MI (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/015,444

(22) Filed: Feb. 4, 2016

(65) Prior Publication Data

US 2016/0159143 A1 Jun. 9, 2016

Related U.S. Application Data

(63) Continuation of application No. 12/084,354, filed as application No. PCT/AU2006/001620 on Oct. 31, 2006, now Pat. No. 9,278,586.

(30) Foreign Application Priority Data

Oct. 31, 2005 (AU) .................................. 2005906023

(51) Int. Cl.
  *B60C 19/00* (2006.01)
  *B60B 21/12* (2006.01)
  *B60C 5/00* (2006.01)

(52) U.S. Cl.
  CPC ................ *B60B 21/12* (2013.01); *B60C 5/00* (2013.01); *B60C 19/002* (2013.01);
  (Continued)

(58) Field of Classification Search
  CPC ......... B60B 21/12; B60C 17/04; B60C 17/06; B60C 17/065; B60C 19/00; B60C 19/002
  See application file for complete search history.

(56) References Cited

U.S. PATENT DOCUMENTS

| 3,214,323 A | 10/1965 | Russell et al. |
| 4,392,522 A | 7/1983 | Bschorr |

(Continued)

FOREIGN PATENT DOCUMENTS

| DE | 6930307 U | 12/1969 |
| DE | 19714348 A1 | 2/2008 |

(Continued)

OTHER PUBLICATIONS

Korean Office Action dated Feb. 22, 2013.
Chinese Office Action dated Feb. 4, 2013.
European Extended Search Report dated Oct. 4, 2012.

*Primary Examiner* — Jason R Bellinger
(74) *Attorney, Agent, or Firm* — The Dobrusin Law Firm, P.C.

(57) ABSTRACT

An in-tire sound absorber for a pneumatic wheel assembly including a wheel rim and a tire fitted to the wheel rim. The sound absorber is adapted to be located within a cavity defined by the wheel rim and the tire. The sound absorber comprises a first fibrous layer and a second fibrous layer. The second fibrous layer has a higher air flow resistance than the first fibrous layer. The first fibrous layer, the second fibrous layer, or both, is made from a non-woven fibrous web.

20 Claims, 6 Drawing Sheets

(52) U.S. Cl.
CPC ... *B60B 2360/322* (2013.01); *B60B 2900/133* (2013.01); *Y10T 442/659* (2015.04)

(56) References Cited

U.S. PATENT DOCUMENTS

| | | |
|---|---|---|
| 4,399,851 A | 8/1983 | Bschorr |
| 6,244,314 B1 | 6/2001 | Dodt et al. |
| 6,390,563 B1 | 5/2002 | Haverkamp et al. |
| 6,598,636 B1 | 7/2003 | Schurmann et al. |
| 6,755,483 B2 | 6/2004 | Yukawa et al. |
| 7,867,601 B2 | 1/2011 | Ikishima et al. |
| 9,278,586 B2 * | 3/2016 | Kierzkowski ........... B60B 21/12 |
| 2001/0015249 A1 | 8/2001 | Mohr |
| 2002/0033215 A1 | 3/2002 | Aoki |
| 2003/0068943 A1 | 4/2003 | Fay |
| 2003/0188817 A1 | 10/2003 | Yukawa et al. |
| 2004/0173298 A1 | 9/2004 | Boiocchi et al. |
| 2004/0231915 A1 | 11/2004 | Thompson, Jr. et al. |
| 2004/0238275 A1 | 12/2004 | Keller et al. |
| 2005/0211358 A1 | 9/2005 | Tanno |
| 2006/0090958 A1 | 5/2006 | Coates et al. |
| 2006/0289231 A1 | 12/2006 | Priebe et al. |
| 2008/0050565 A1 | 2/2008 | Gross et al. |
| 2009/0148644 A1 | 6/2009 | Francis |

FOREIGN PATENT DOCUMENTS

| | | |
|---|---|---|
| EP | 0911185 A2 | 4/1999 |
| EP | 1577123 B1 | 9/2005 |
| GB | 823203 A | 11/1959 |
| JP | 7266802 A | 10/1995 |
| JP | 200267608 A | 3/2002 |
| WO | 02/09089 A | 1/2002 |
| WO | 02/085648 A1 | 10/2002 |

* cited by examiner

IN TIRE SOUND ABSORBER

CLAIM OF BENEFIT OF FILING DATE

The present application is a continuation of U.S. application Ser. No. 12/084,354, now U.S. Pat. No. 9,278,586, having a §371(c) date of Sep. 16, 2009; which is a National Stage Entry of International Application No. PCT/AU2006/001620, filed on Oct. 31, 2006; which claims the benefit of the filing date of Australian Application No. 2005906023, filed on Oct. 31, 2005; the contents of all of which are expressly incorporated by reference.

BACKGROUND

Technical Field

This invention relates to an in-tire sound absorber for the reduction of tonal sounds in pneumatic tires.

Description of the Related Art

Tonal sound is caused by a standing wave generated in the space between the tire and wheel rim. This standing wave relates to the geometry of the tire, and the temperature and pressure of the air in the tire cavity. The resultant tone or sound is typically below 600 Hz.

The problem of tonal noise transmission into the motor vehicle cabins has been addressed by a number of means. U.S. Pat. No. 6,755,483 (Sumitomo Rubber Industries, Ltd.) describes the use of a noise damper disposed in the cavity formed between the rim and the tyre. The noise damper is made from porous material which has a specific density of between 0.005 and 0.06 and in particular an open-cell polyurethane foam. In one embodiment, the noise damper has an uneven facing, or is made from an outer layer having low sound reflection and an inner layer, adjacent the wheel rim, having high sound absorption.

However, it is often a problem with the prior art that the noise damper can be damaged during fitment of the tire on the wheel rim or the noise damper is not physically strong enough to resist tearing or breaking apart during normal operation.

BRIEF SUMMARY

It is an object of the invention to overcome, or at least ameliorate, some of the above problems or at least provide an alternative in-tire silencer material and a system utilizing the in-tire silencer material.

Accordingly in one aspect, the present invention is an in-tire sound absorber for a pneumatic wheel assembly including a wheel rim and a tire fitted to the wheel rim, the sound absorber comprising a first fibrous layer and a second fibrous layer, the second layer having a higher air flow resistance than the first layer, and being configured to fit around the wheel rim with the first layer in contact with a surface of the wheel rim and extending substantially between the second layer and the wheel rim.

The low air flow resistance of the first layer allows the standing sound pressure wave to propagate within the layer where the particle velocity of the radial pressure wave that creates the tonal noise is in a normal direction to the direction of the pressure wave. The excited air particles are thereby forced through the high air flow resistance of the second layer to provide the sound absorption.

Preferably the first and second layers are made from non-woven fibrous webs. In a preferred embodiment, the first fibrous layer has fibers orientated substantially perpendicular to the surface of the wheel rim. The orientation substantially perpendicular to the surface of the wheel rim provides an increased tensile strength of the sound absorber in the direction perpendicular to the surface of the wheel rim when contrasted with conventional bulky non-woven fabrics in which the fibers are cross-lapped. This is particularly advantageous for embodiments where the centrifugal forces increase with the rotational speed of the wheel during operation and the increased tensile strength in the direction perpendicular to the surface of the wheel rim decreases the risk of delamination of the sound absorber.

Preferably, the air flow resistance of the respective layers is substantially consistent to Provide a relatively constant acoustic absorption to reduce the tonal noise. In some embodiments, the ratio of air flow resistance of the second layer to the first layer is between 25:1 and 35:1. That is the air flow resistance of the second layer is between 25 and 35 times that of the first layer. In some embodiments, the ratio is approximately 30:1.

The spatial average of the air flow resistance of the second layer is between 400 and 1000 Rayls. In some embodiments, the spatial average is in the range of 600-800 Rayls.

The spatial average of the flow resistivity of the spacer layer is in the range of 800-8000 Rayls/m. In some embodiments, the spatial average is 2000-4000 Rayls/m.

The first layer of the sound absorber can be made from a fibrous web of polyester fibers. In some embodiments, the second layer of the sound absorber is made from a fibrous web of polyester fibers.

According to another aspect of the present invention, a tire sound absorbing system includes a tire, a wheel rim, the wheel rim and tire forming an enclosed tire cavity, and a porous insert disposed adjacent a surface of the wheel rim within the tire cavity, the porous insert comprising an inner fibrous layer proximal to the wheel rim surface and an outer fibrous layer distal to the wheel rim surface, the outer fibrous layer has a higher air flow resistance than the inner fibrous layer, and wherein the porous insert is shaped to avoid damage during fitment of the tire on the rim.

The porous insert is shaped so that the bead of the tire is able to push aside the sound absorber during fitment so that damage to the sound absorber is avoided. The porous insert has rounded edges to assist the tire bead in pushing the sound absorber to a position where the risk of damage is reduced. Even more preferably the rounded edges are formed by thermoforming. The rounded edges can be slit or notched to avoid creasing of the porous insert.

The porous fibrous insert is removably attached to the wheel rim. A hook and loop attachment means is used wherein the loops are formed by the inner fibrous layer and the hooks are attached to the wheel rim.

BRIEF DESCRIPTION OF THE SEVERAL VIEWS OF THE DRAWINGS

Preferred embodiments of the present invention will now be described by way of example only with reference to the below figures.

DETAILED DESCRIPTION

Figure 1:
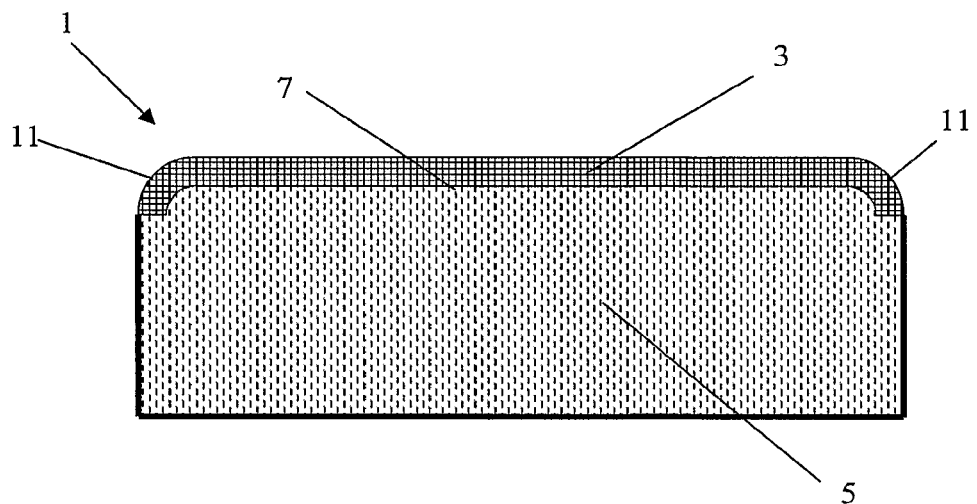
FIG. 1 is a cross-sectional view of an in-tire sound absorber according to one embodiment of the invention.
Figure 2:
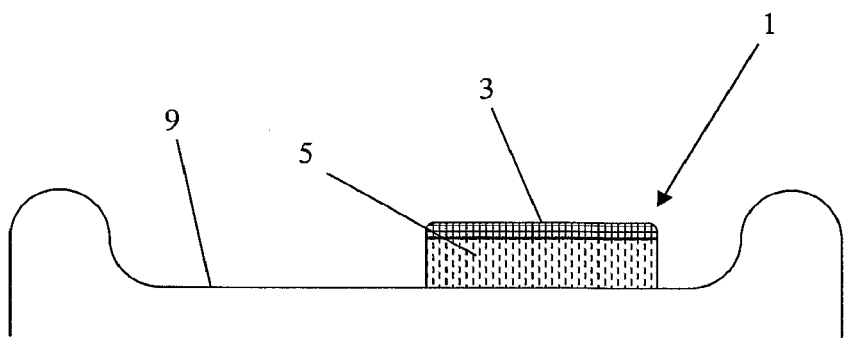
FIG. 2 is a cross-sectional view of the in-tire sound absorbing system using the in-tire sound absorber of FIG. 1 installed on a wheel rim.

Referring to FIGS. 1-4 the in-tire sound absorber 1 is comprised of a first layer 3 of a thermoformable acoustic sheet, backed with a second layer 5 of a spacing layer of vertically lapped 3-dimensional thermally bonded non-woven fabric. The thermoformable acoustic sheet 3 is laminated to the vertically lapped fabric 5 using a thermoplastic adhesive 7 that is permeable. The sound absorber 1 is installed on a wheel rim 9 to absorb at least some of the tonal noise of the tire.

The thermoformable acoustic sheet 3 is prepared generally in accordance with the applicant's International patent application published as WO 02/09089. The thermoformable acoustic sheet 3 is formed using polyester fiber, has an air flow resistance between 400 and 1000 Rayls and a high resistance to tearing. Alternatively, the sheet 3 can be formed from polypropylene or other suitable fiber. The sheet 3 has a thickness of approximately 0.5-1 mm, and a mass of approximately 50-250 g/m$^2$.

The vertically lapped fabric 5 is also made of polyester fibers. An advantage of the two layers 3, 5 being made of the same material is that the sound absorber 1 is recyclable. When installed the fibers in the fabric 5 are generally orientated in the radial direction because of the vertically lapped structure of the fabric 5. This provides additional strength to prevent separation of the sound absorber 1 due to the centrifugal forces encountered during normal operation of the wheel. The flow resistivity of the spacer layer 5 is less than that of the thermoformable acoustic sheet 3 and is between 800 and 8000 Rayls/m.

Prior to installation on the wheel rim 9 the edges 11 of the thermoformable acoustic sheet 3 are molded to provide a rounded edge to the sound absorber 1 so that the risk of tearing of the sound absorber 1 during fitment of the tire on the wheel rim 9 is reduced. This occurs because the tire bead is able to push aside the sound absorber 1 during fitment and there are no sharp edges to catch on. Thus it is possible to install a tire on the wheel rim 9 without damaging the sound absorber 1 and without using a special groove in the wheel rim 9 to shelter the absorber 1. The radius on the sound absorber edge 11 is typically in the range of 15-20 mm.

An added advantage of the rounded edges 11 and high tear resistance of the thermoformable acoustic sheet 3 is that the sound absorber 1 also resists damage from a tire lever during removal of the tire. This makes the sound absorber 1 suitable for use on the wheel rim 9 with a number of tires, prolonging the life of the sound absorber 1.

To provide the necessary sound absorption, the low air flow resistance of the spacing layer 5 allows the standing sound pressure wave to propagate within the spacing layer 5. The particle velocity of the radial pressure wave that creates the tonal noise is in a normal direction to the direction of the pressure wave. Thus the excited air particles are forced through the high air flow resistance thermoformable acoustic sheet 3 which provides the sound absorption.

The sound absorber 1 is attached to the wheel rim 9 by an adhesive, mechanical fastening, or a combination of both. The adhesive, mechanical fastening or combination must securely hold the sound absorber 1 in place during replacement of the tire while still allowing the tire bead to push the sound absorber 1 aside during installation.

Figure 3:
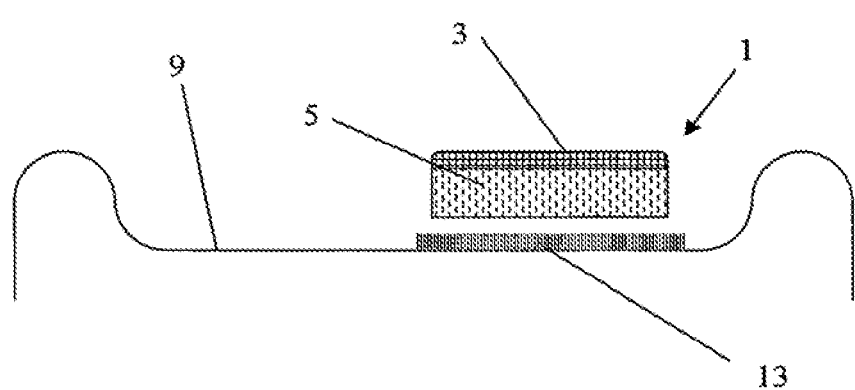
FIG. 3 is a cross-sectional view of an in-tire sound absorbing system using the in-tire sound absorber of FIG. 1 according to another embodiment.
Figure 4A:
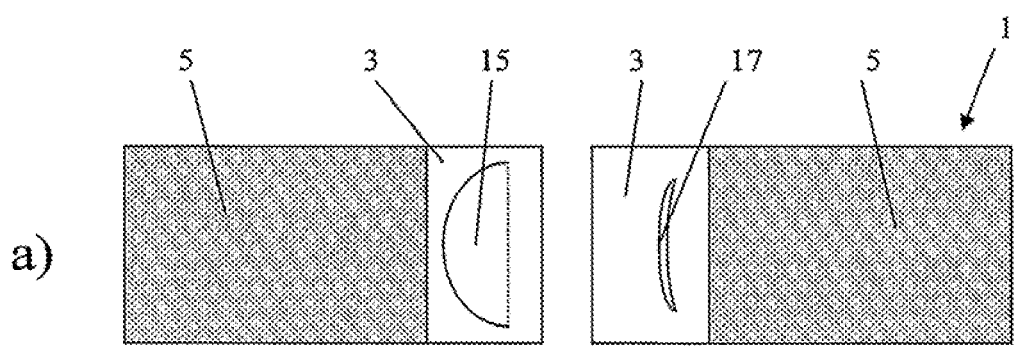
FIG. 4A is a bottom plan view of a tongue and slot joining system for the in-tire sound absorber of FIG. 1.
Figure 4B:
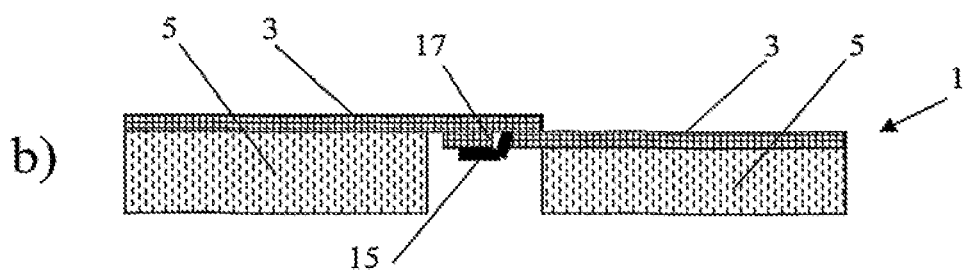
FIG. 4B is a cross-sectional view of a tongue and slot joining system for the in-tire sound absorber of FIG. 1.

In the embodiment shown in FIG. 3, a hook and loop attachment means is used to attach the sound absorber 1 to the wheel rim 9. The vertically lapped spacer material 5 provides the loops and the hooks 13 are attached to the wheel rim 9. In this arrangement the sound absorber 1 is able to be replaced with another sound absorber if the sound absorber 1 becomes ineffective or the tire on the wheel rim changes sufficiently that a sound absorber with slightly different properties would be more suited to the new configuration of the wheel rim 9 and tire.

In order to assist the attachment of the sound absorber 1 to the wheel rim 9, the two ends of the sound absorber 1 can be connected together by means of a fastening arrangement after the sound absorber has been attached to the wheel rim 9. The fastening arrangement 14 shown in FIGS. 4*a* and 4*b* uses a tongue 15 and slot 17 arrangement in the ends of the thermoformable acoustic sheet 3 to effectively form a torus around the wheel rim. An adhesive is also used to secure the sound absorber 1 onto the wheel rim.

In an alternative embodiment, the two ends of the sound absorber may be connected by a hook and loop fastening arrangement, wherein the hook section is affixed to one end of the sound absorber by sewing, gluing or thermal staking, and the loop section is affixed to the other end by similar means.

Other methods of connecting the two ends of the sound absorber 1 may be employed, without departing from the purpose of the invention, such as stapling, riveting, gluing.

In practical embodiments, the thickness of the sound absorber 1 is between 12 to 40 mm and more typically between 20 to 30 mm thick, although the thickness used in an actual installation will depend on physical and acoustical requirements. The maximum practical height of the spacer layer 5 is normally about 25 mm.

The sound absorber 1 is normally between 50 to 150 mm wide depending upon the shape and configuration of the wheel rim 9. However in most wheel rims, the width is between 50 to 100 mm. The width of the sound absorber 1 is generally kept to a minimum without affecting the sound absorption as the wider the sound absorber, the more it affects fitting and removal of the tire. The preferred width is in the range of 70-100 mm. At more than 100 mm wide, the likelihood of the tire bead catching the sound absorber 1 and may prevent the tire from sealing properly.

The sound absorber can be made to a length that is substantially equal to the circumference of the wheel rim, so that each wheel size requires a different length. Alternatively, the length of the sound absorber could be created by cutting excess material from a sound absorber of a standard length. In this embodiment, a fabric may be laminated on the second layer to provide the loops for a hook and loop fastening arrangement where a hook section was attached to one end of the sound absorber. In this arrangement, the hook and loop fastening arrangement could be used regardless of the amount removed from the standard sound absorber length.

Figure 5:
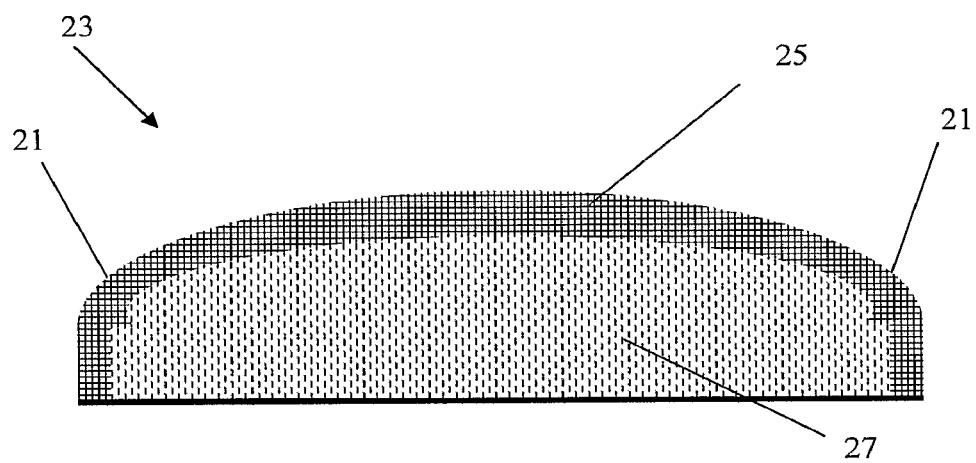
FIG. 5 is a cross-sectional view of an in-tire sound absorber according to an alternative embodiment of the invention

In an alternative embodiment shown in FIG. 5, the edges 21 of the sound absorber 23 are molded such that the second layer 25, a thermoformable acoustic sheet, extends along a substantial portion of the sides of the sound absorber 21. The extension of the thermoformable acoustic sheet 25 along the sides of the sound absorber 21 increases the resistance of the sound absorber 21 to damage to the first layer 27, a vertically lapped fabric, during tire fitment.

As the curvature of sound absorber decreases with the thickness of the sound absorber when installed on the wheel rim, the edges of the thermoformable acoustic sheet 3 may be slit at regular intervals along the length of the sound absorber. This provides for overlapping of the edge at these intervals of the thermoformable to reduce the likelihood of humps forming in the sound absorber and thereby making tire fitment more difficult. Alternatively, the edges of the thermoformable acoustic sheet are notched. It should also be noted that the sound absorber may be molded on a circular molding tool so that the curvature of the sound absorber is substantially permanently molded into the sound absorber.

Example 1

A prototype tire sound absorber, according to one embodiment of this invention with a lower air flow resistance spacer layer and a higher air flow resistance thermoformable acoustic sheet, was made up and attached to alloy wheel rims using a pressure sensitive adhesive. Low profile tires were then fitted to the rim in the normal manner.

The alloy wheel rims were 18 inches diameter by 8 inches wide and the tires were Pontenza RE55S, 265/35ZR18.

The sound absorber measured 20 mm thick, 90 mm wide and molded with a radius on the leading edge.

The sound absorber had a thermoformable acoustic sheet with a measured spatial average flow resistance of 600 Rayls, and weighed 180 g/m$^2$, with a thickness of approximately 0.5 mm.

The spacer layer had a density of 600 g/m$^2$ and consisted of a blend of polyester fibers with an average fiber size of 6-denier. The spacer consisted of 30% polyester bicomponent fiber and 70% polyester staple fiber. The spatial average air flow resistance of the spacer layer was about 20 Rayls or approximately 1130th the spatial average air flow resistance of the thermorformable acoustic sheet.

The wheel, fitted with the tire and the sound absorber, as described above, was suspended freely from a chain and allowed to gently touch an electromagnetic shaker, which was used to excite the whole assembly. An accelerometer was connected to the shaker to measure the input excitation signal. Another accelerometer was attached to the tire, and the transfer function was measured using 2-channel a signal analyzer.

Figure 6A:
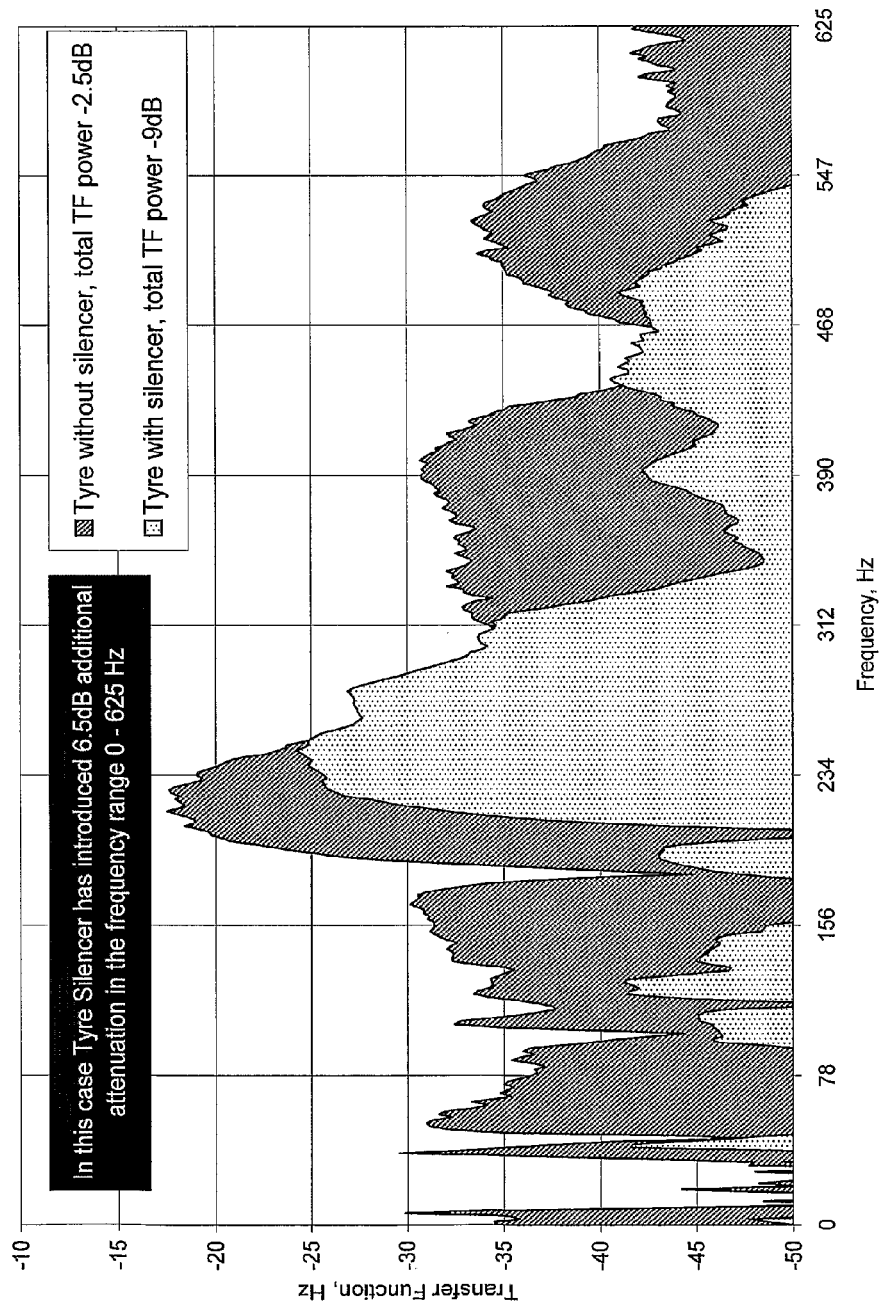
FIG. 6A to 6C are graphs of the Noise versus Frequency of the test results of Example 1.
Figure 6B:
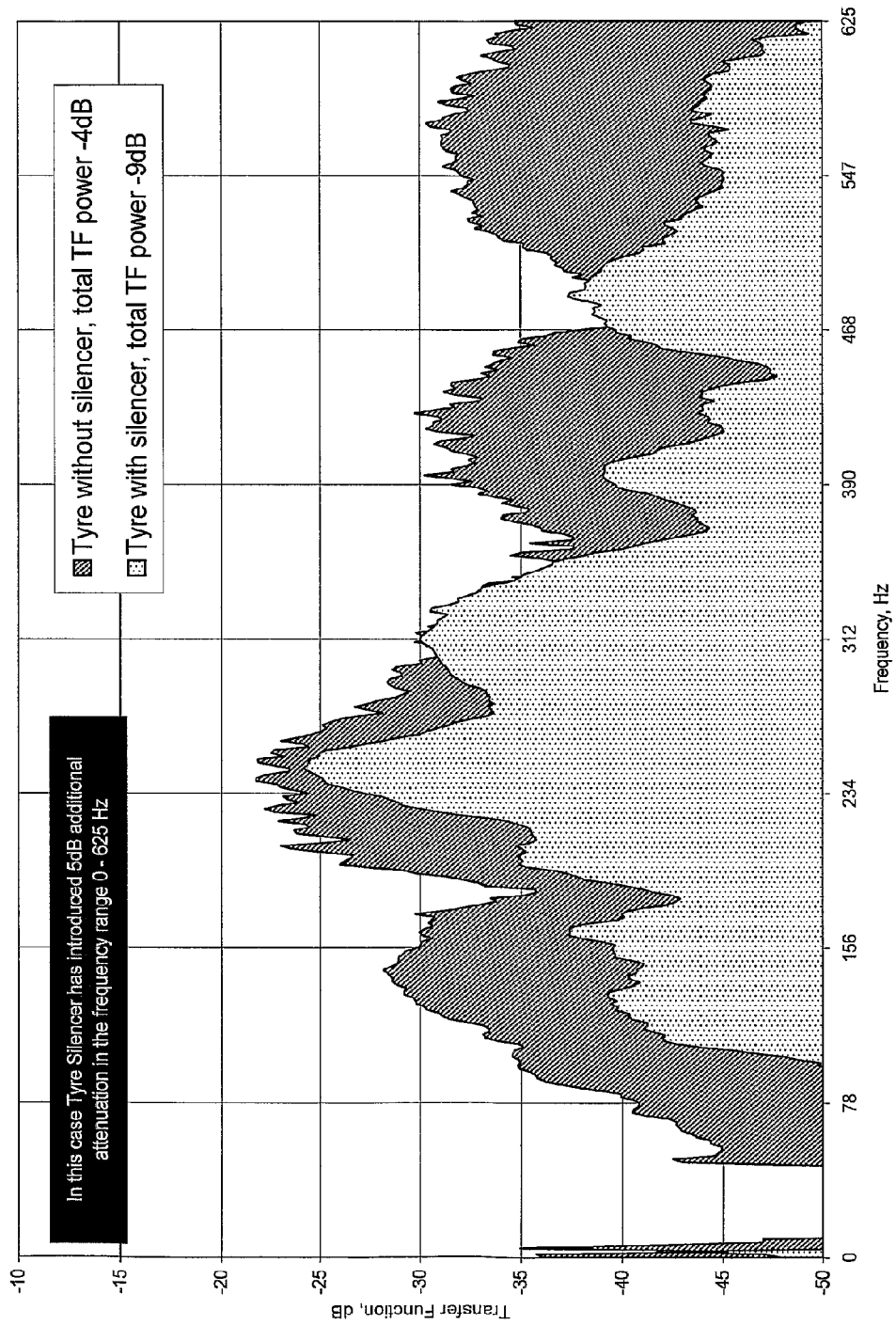
Figure 6C:
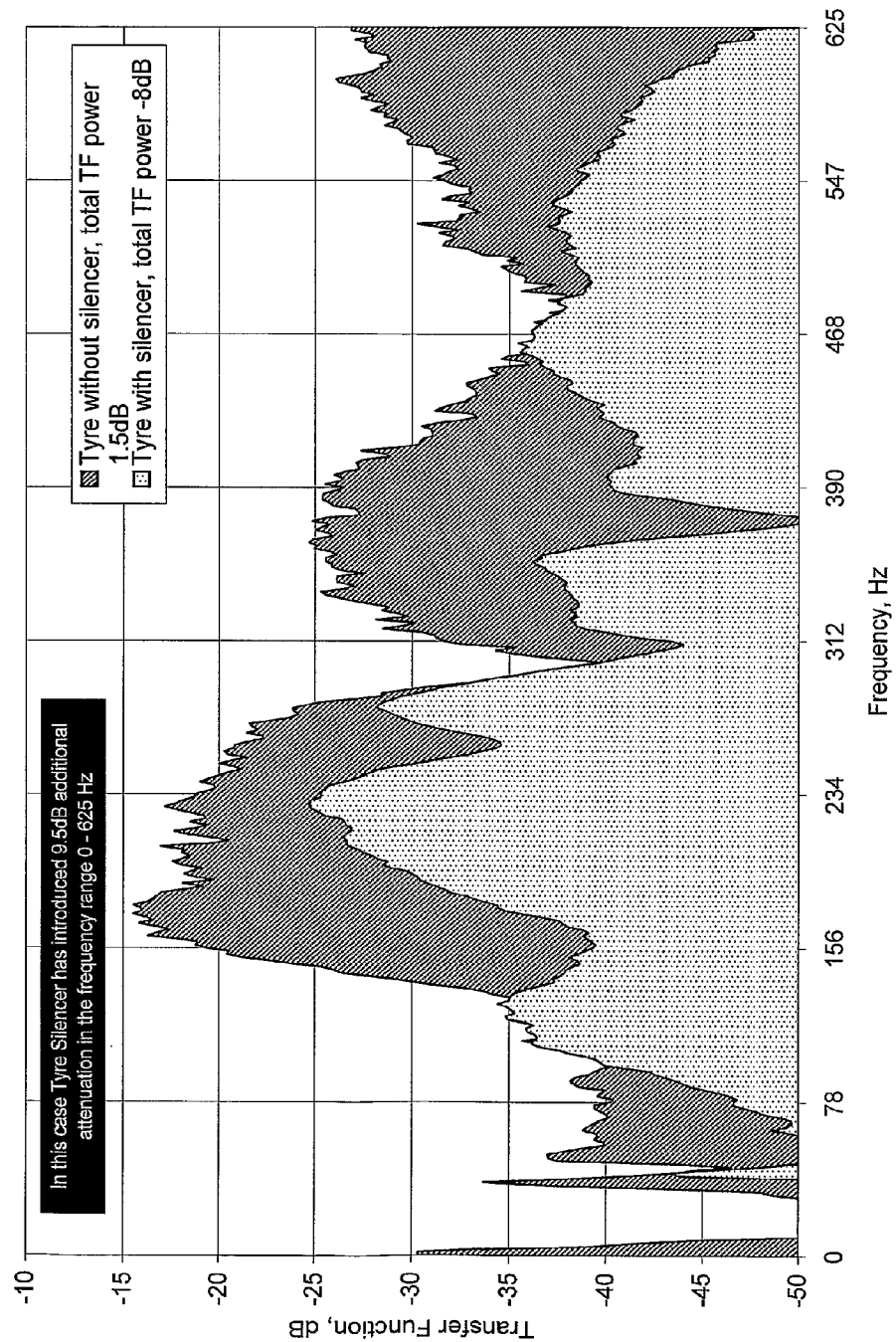

Tests were conducted at two excitation spots on the tire and data obtained at 16 different measuring points for each excitation spot, and the results similarly recorded. The results of three measuring points, which are representative of the transfer functions of all of the tests conducted, are shown in FIGS. 6A, 6B and 6C. The area under the curves was integrated to determine the total power content and was compared to a total power content measured of the tire without the in-tire silencer installed. By subtracting the power content in these examples, the anticipated reduction in power content, in the frequency range from zero to 600 Hz, was then calculated.

There was a consistent reduction in the acoustic energy propagated inside the tire. The total reduction in power content was within the range of 5.5 to 9 decibels, depending on the position of the measurement.

Such a reduction will be translated into a reduction of vibrational excitation between the tyre, the vehicle suspension, and the vehicle body, resulting in an audible noise reduction within the vehicle. The actual noise reduction within the vehicle is dependent on the sensitivity of the transmission path between the tire and the vehicle interior.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An in-tire sound absorber for a pneumatic wheel assembly including a wheel rim and a tire fitted to the wheel rim, the sound absorber adapted to be located within a cavity defined by the wheel rim and the tire,
   the sound absorber comprising a first fibrous layer and a second fibrous layer, the second fibrous layer having a higher airflow resistance than the first fibrous layer, wherein the first fibrous layer, the second fibrous layer, or both, is made from a non-woven fibrous web.

2. The sound absorber according to claim 1, wherein the first and second fibrous layers are made from non-woven fibrous webs.

3. The sound absorber according to claim 1, wherein the first fibrous layer has fibers orientated substantially perpendicular to a surface of the wheel rim.

4. The sound absorber according to claim 1, wherein the air flow resistance of the respective layers is substantially consistent to provide a substantially constant acoustic absorption to reduce the tonal noise.

5. The sound absorber according to claim 1, wherein a spatial average of the air flow resistance of the second fibrous layer is between 400 and 1000 Rayls.

6. The sound absorber according to claim 5, wherein the spatial average of the air flow resistance of the second fibrous layer is between 600 and 800 Rayls.

7. The sound absorber according to claim 1, wherein a spatial average of the flow resistivity of the first fibrous layer is in a range of 800-8000 Rayls/m.

8. The sound absorber according to claim 7, wherein the spatial average of the flow resistivity of the first fibrous layer is in the range of 2000-4000 Rayls/m.

9. The sound absorber according to claim 1, wherein the air flow resistance of the second fibrous layer is between 25 and 35 times that of the first fibrous layer.

10. The sound absorber according to claim 9, wherein a ratio of the air flow resistance of the second fibrous layer to that of the first fibrous layer is approximately 30:1.

11. The sound absorber according to claim 1, wherein the first fibrous layer of the sound absorber is made from a fibrous web of polyester fibers.

12. The sound absorber according to claim 1, wherein the second fibrous layer of the sound absorber is made from a fibrous web of polyester fibers.

13. The sound absorber according to claim 11, wherein both the first fibrous layer and the second fibrous layer of the sound absorber are made from a fibrous web of polyester fibers so that the sound absorber is recyclable.

14. The sound absorber according to claim 1, wherein the first fibrous layer is a vertically lapped material.

15. The sound absorber according to claim 1, wherein the second fibrous layer is a thermoformable acoustic sheet.

16. The sound absorber according to claim 1, wherein the second fibrous layer is laminated to the first fibrous layer.

17. A sound absorbing system comprising:
a. a tire,
b. a wheel rim, the wheel rim and tire forming an enclosed tire cavity, and
c. a porous insert disposed within the tire cavity comprising:
    a. a first fibrous layer comprising a vertically lapped thermally bonded nonwoven material, and
    b. a second fibrous layer comprising a thermoformable acoustic sheet,
        wherein the first fibrous layer, the second fibrous layer, or both, is made from a fibrous web of polyester fibers;
        wherein the second fibrous layer has a higher air flow resistance than the first fibrous layer.

18. The sound absorbing system according to claim 17, wherein the second fibrous layer is laminated to the first fibrous layer with a permeable thermoplastic adhesive.

19. The sound absorbing system according to claim 17, wherein the porous insert reduces acoustic energy propagated inside the tire by 5.5 to 9 decibels.

20. The sound absorbing system according to claim 17, wherein a spatial average of the air flow resistance of the second fibrous layer is between 400 and 1000 Rayls, and wherein a spatial average of the flow resistivity of the first fibrous layer is in a range of 800-8000 Rayls/m.

\* \* \* \* \*